US011930318B2

(12) United States Patent
Lee et al.

(10) Patent No.: US 11,930,318 B2
(45) Date of Patent: Mar. 12, 2024

(54) ELECTRONIC DEVICE

(71) Applicant: Merry Electronics Co., Ltd., Taichung (TW)

(72) Inventors: Yueh-Kang Lee, Taichung (TW); Jen-Yi Chen, Taichung (TW); Kai-Yu Jiang, Taichung (TW)

(73) Assignee: Merry Electronics Co., Ltd., Taichung (TW)

( * ) Notice: Subject to any disclaimer, the term of this patent is extended or adjusted under 35 U.S.C. 154(b) by 415 days.

(21) Appl. No.: 17/355,185

(22) Filed: Jun. 23, 2021

(65) Prior Publication Data

US 2022/0303667 A1 Sep. 22, 2022

Related U.S. Application Data

(60) Provisional application No. 63/163,066, filed on Mar. 19, 2021.

(51) Int. Cl.
*H04R 1/22* (2006.01)
*H04R 1/02* (2006.01)

(52) U.S. Cl.
CPC ............... *H04R 1/222* (2013.01); *H04R 1/02* (2013.01)

(58) Field of Classification Search
CPC . H04R 1/02; H04R 1/04; H04R 1/222; H04R 31/003; H04R 2201/003; H04R 2410/07; H01L 2924/16152; G01H 11/06; G01H 11/08; G01L 19/14–149
See application file for complete search history.

(56) References Cited

U.S. PATENT DOCUMENTS

| | | | | |
|---|---|---|---|---|
| 8,433,084 | B2 * | 4/2013 | Conti | H04R 19/005 381/174 |
| 9,369,788 | B1 * | 6/2016 | Ho | B81B 7/0061 |
| 9,380,377 | B2 * | 6/2016 | Jingming | H04R 1/02 |
| 9,698,129 | B2 * | 7/2017 | Pugh | G02C 7/083 |
| 10,225,635 | B2 * | 3/2019 | Brioschi | B81B 7/008 |
| 10,605,684 | B2 * | 3/2020 | Gritti | G01L 9/0045 |
| 2016/0112801 | A1 * | 4/2016 | Yoo | H04R 7/10 381/174 |
| 2022/0169499 | A1 * | 6/2022 | Lafort | B06B 1/12 |

* cited by examiner

*Primary Examiner* — Justin N Olamit
(74) *Attorney, Agent, or Firm* — JCIPRNET

(57) ABSTRACT

An electronic device, including a first substrate, a partition wall structure, a pressurizing component, a second substrate, a shell, and multiple first conductive parts, is provided. The first substrate has a through hole, and a first surface and a second surface that are opposite to each other. The partition wall structure is disposed on the first surface and surrounds to form a first chamber. The pressurizing component is disposed on the partition wall structure and covers the first chamber. The pressurizing component includes at least a mass and a vibration membrane. The shell is disposed on the second substrate and jointly forms a second chamber with the second substrate. The first chamber is formed in the second chamber. The multiple first conductive parts are disposed between the first substrate and the second substrate. There is a gap between any two adjacent first conductive parts.

19 Claims, 7 Drawing Sheets

ELECTRONIC DEVICE

CROSS-REFERENCE TO RELATED APPLICATION

This application claims the priority benefit of U.S. provisional application Ser. No. 63/163,066, filed on Mar. 19, 2021. The entirety of the above-mentioned patent application is hereby incorporated by reference herein and made a part of this specification.

BACKGROUND

Technical Field

This disclosure relates to a device, and in particular to an electronic device

Description of Related Art

In general, configurations of components in an electronic device and a design of a corresponding chamber are often closely related to its sensitivity. For example, when the configuration of the components in the electronic device and the design of the corresponding chamber are not good (such as the chamber is too small), it is easy to lead to high air resistance. As a result, the sensitivity of the electronic device is reduced. Therefore, how to effectively improve its sensitivity remains a challenge.

SUMMARY

This disclosure provides an electronic device, which can effectively improve its sensitivity.

An electronic device of the disclosure includes a first substrate, a partition wall structure, a pressurizing component, a second substrate, a shell, and multiple first electrically conductive parts. The first substrate has a through hole, and a first surface and a second surface that are opposite to each other. The partition wall structure is disposed on the first surface and surrounds to form a first chamber. The pressurizing component is disposed on the partition wall structure and covers the first chamber. The pressurizing component includes at least a mass and a vibration membrane. The shell is disposed on the second substrate and jointly forms a second chamber with the second substrate. The first chamber is formed in the second chamber. The multiple first electrically conductive parts are disposed between the first substrate and the second substrate. There is a gap between any two adjacent first electrically conductive parts.

In an embodiment of the disclosure, the electronic device further includes a sensor disposed on the first surface and covering the through hole.

In an embodiment of the disclosure, the electronic device further includes a back cavity.

Air in the back cavity circulates with air in the second chamber through the gap.

In an embodiment of the disclosure, the electronic device further includes a solder wire and an insulation layer that are disposed on the sensor. The insulation layer wrap arounds a portion of the solder wire.

In an embodiment of the disclosure, a shortest distance of the insulation layer relative to the vibration membrane is smaller than a shortest distance of the solder wire relative to the vibration membrane.

In an embodiment of the disclosure, the sensor is formed in the first chamber and is disposed between the first substrate and the vibration membrane.

In an embodiment of the disclosure, configurations of the sensor, the first substrate, and the multiple first electrically conductive parts are at least partially overlapped.

In an embodiment of the disclosure, the multiple first electrically conductive parts are a portion of the second substrate, protrude from an upper surface of the second substrate toward the first substrate, and form an electrical connection with the first substrate.

In an embodiment of the disclosure, the multiple first electrically conductive parts are multiple metal solder balls.

In an embodiment of the disclosure, a height range of each of the first electrically conductive parts is between 30 μm and 50 μm.

In an embodiment of the disclosure, the shell is made of a metal material and has at least one groove. The first chamber is formed in the at least one groove.

In an embodiment of the disclosure, the electronic device further includes a second electrically conductive part. The second electrically conductive part is surround disposed between the shell and the second substrate, and the shell forms an electrical connection with the second substrate through the second electrically conductive part.

In an embodiment of the disclosure, the electronic device further includes an opening. The opening connects the second chamber with external air, so as to release pressure in the second chamber.

In an embodiment of the disclosure, the opening is located on the shell.

In an embodiment of the disclosure, the mass is disposed on the vibration membrane and is located in the first chamber.

In an embodiment of the disclosure, the mass is disposed on the vibration membrane and is located outside the first chamber.

In an embodiment of the disclosure, the electronic device further includes a fixing ring disposed between the vibration membrane and the partition wall structure. The fixing ring is made of a rigid material.

In an embodiment of the disclosure, the fixing ring and the partition wall structure are an integrally formed ring structure.

In an embodiment of the disclosure, the partition wall structure and the first substrate are jointly formed as a printed circuit board structure with a groove.

In an embodiment of the disclosure, the first chamber and second chamber are two independent chambers.

Based on the above, the electronic device of the disclosure may increase the volume of the first chamber and reduce the air resistance by disposing the pressurizing component on the partition wall structure and covering the first chamber, thereby effectively improving its sensitivity. In addition, since there are gaps between the multiple first electrically conductive parts that are disposed between the first substrate and the second substrate, air can circulate in the second chamber, so as to increase the vibration energy of the vibration membrane. In this way, the electronic device may be enabled to have the flatter response at the lower frequency and better sensitivity.

To make the abovementioned more comprehensible, several embodiments accompanied by drawings are described in detail as follows.

DESCRIPTION OF THE EMBODIMENTS

Figure 1A:
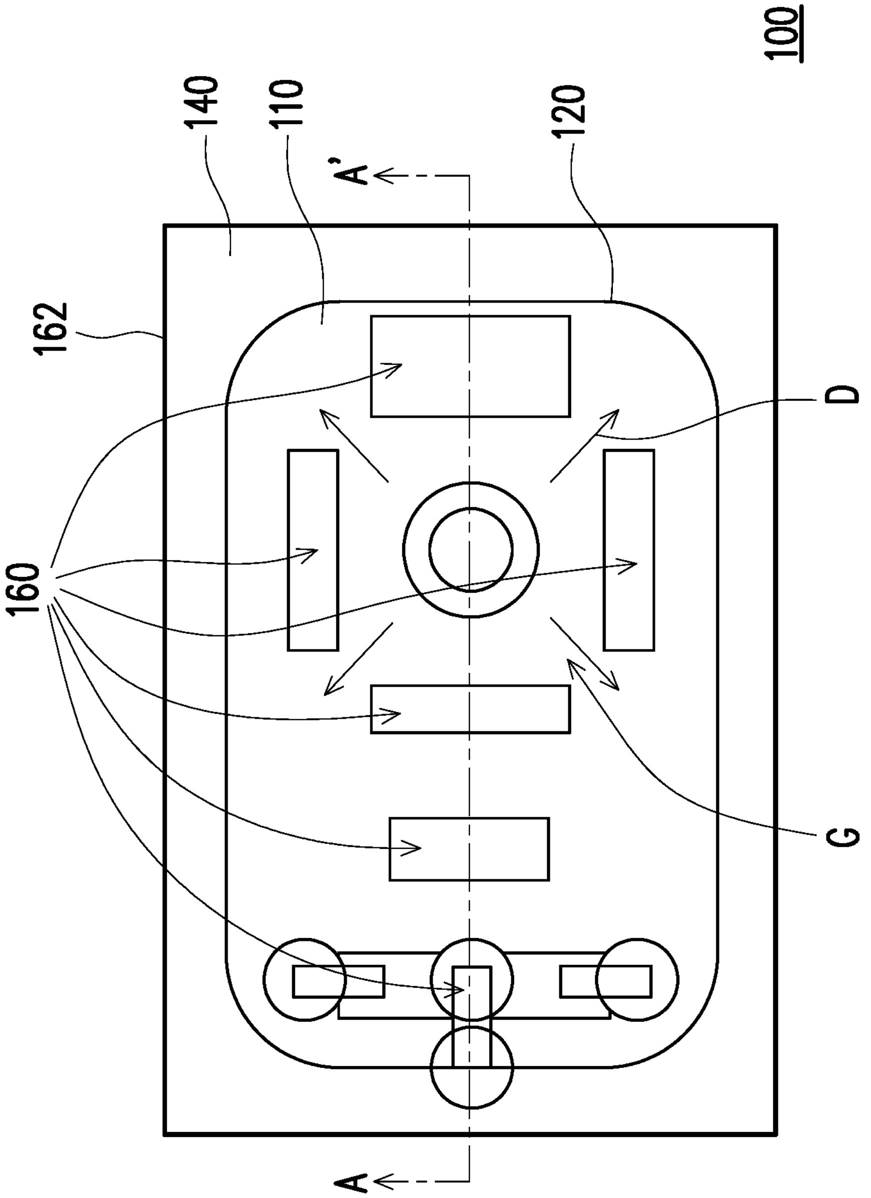
FIG. 1A is a schematic top view of an electronic device according to an embodiment of the disclosure.

Directional terms used in the text (for example, up, down, right, left, front, back, top, bottom) are only used as reference to the drawings and are not intended to imply any absolute orientation.

The disclosure is explained in detail with reference to the accompanying drawings of the embodiments. However, the disclosure may also be embodied in various different forms and should not be limited to the embodiments described herein. The thickness, size, or dimension of the layers or regions in the drawings is exaggerated for clarity. The same or similar reference numerals indicate the same or similar elements, which are not repeated one by one in the following paragraphs.

Figure 1B:
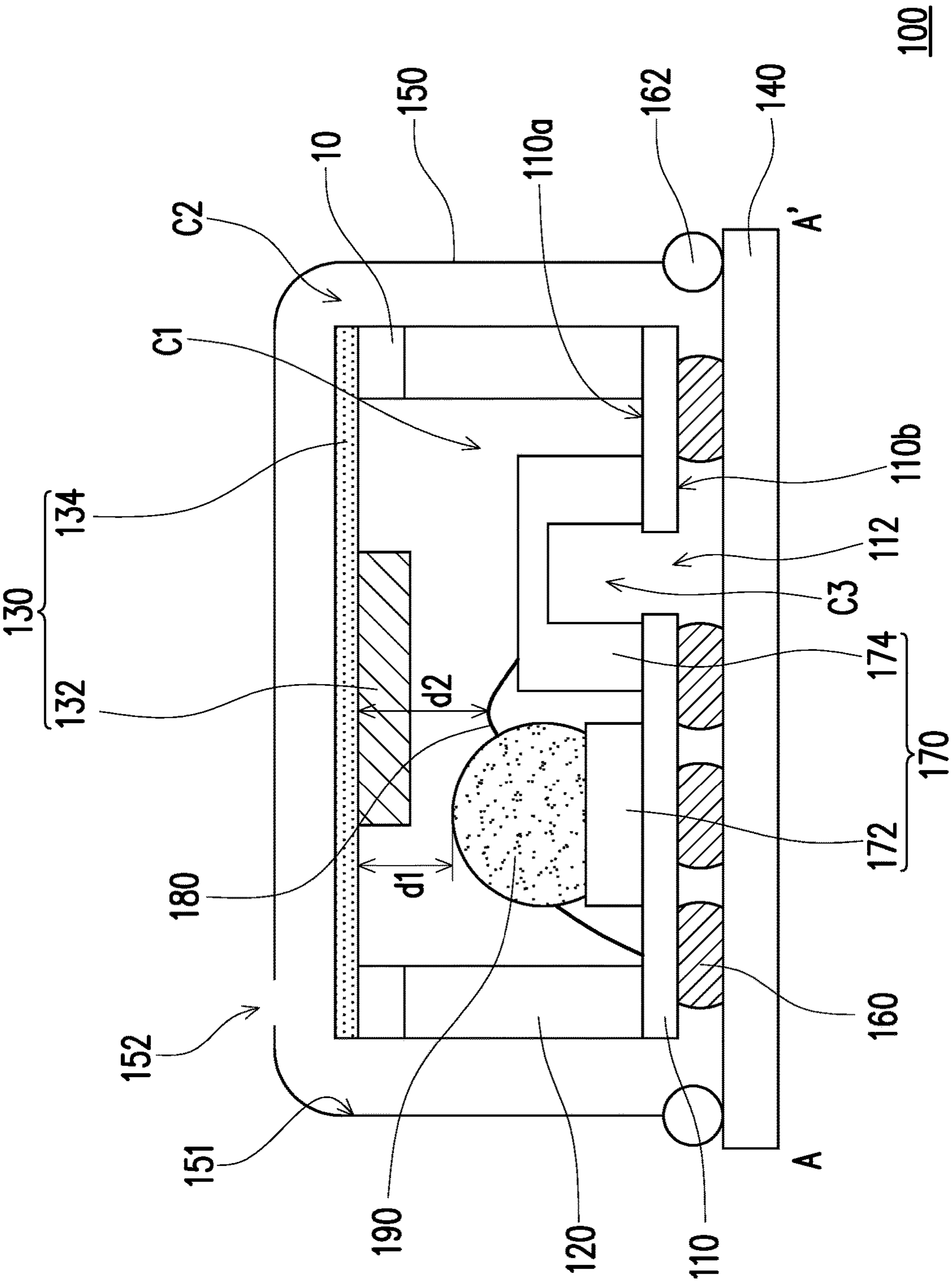
FIG. 1B is a schematic cross-sectional view taken along a line A-A' in FIG. 1A.
Figure 1C:
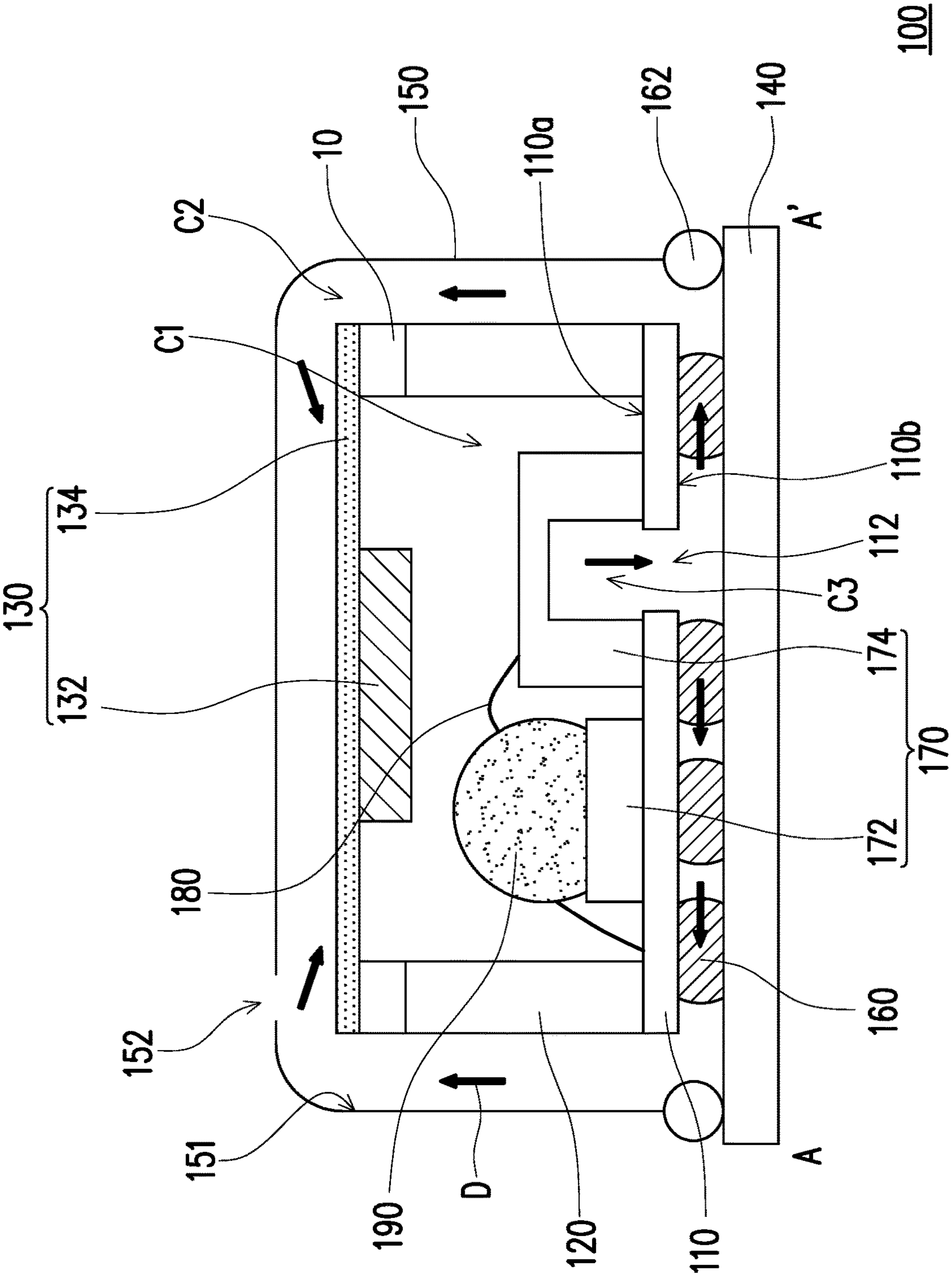
FIG. 1C is a schematic view of an air flow direction in FIG. 1B.

FIG. 1A is a schematic top view of an electronic device according to an embodiment of the disclosure. FIG. 1B is a schematic cross-sectional view taken along a line A-A' in FIG. 1A. FIG. 1C is a schematic view of an air flow direction in FIG. 1B.

With reference to FIGS. 1A to 1C, in the embodiment, an electronic device 100 includes at least a first substrate 110, a partition wall structure 120, a pressurizing component 130, a second substrate 140, a shell 150, and multiple first electrically conductive parts 160. The partition wall structure 120 and the pressurizing component 130 are both disposed on a same side of the first substrate 110, and the second substrate 140 and the multiple first electrically conductive parts 160 are both disposed on another side of the first substrate 110 relative to the partition wall structure 120 and the pressurizing component 130. In addition, the pressurizing component 130 includes a mass 132 and a vibration membrane 134.

Furthermore, as shown in FIG. 1B, the partition wall structure 120 is disposed on a first surface 110*a* of the first substrate 110 and surrounds to form a first chamber C1, the pressurizing component 130 is disposed on the partition wall structure 120 and covers the first chamber C1, and the shell 150 is disposed on the second substrate 140 and jointly forms a second chamber C2 with the second substrate 140. In this design, the first chamber C1 is formed in the second chamber C2. Therefore, when the external environment vibrates, the pressurizing component 130 may generate a concomitant vibration, and the mass 132 acts to increase mass and vibration of the vibration membrane 134, so as to vibrate air in the first chamber C1 and transmit it in a direction of the first substrate 110. Accordingly, the electronic device 100 of the embodiment increases a volume of the first chamber C1 and reduces air resistance through the above configuration, thereby effectively improving its sensitivity.

On the other hand, the multiple first electrically conductive parts 160 are disposed between the first substrate 110 and the second substrate 140. In other words, the multiple first electrically conductive parts 160 are disposed on a second surface 110*b* of the first substrate 110 that is relative to the first surface 110*a*, and there is a gap G between any two adjacent first electrically conductive parts 160, so that air may circulate in the second chamber C2 (an air circulation direction D is, for example, from a through hole 112 of the first substrate 110, passing through the gap G, and then back to the pressurizing component 130 from bottom to top, as shown in FIGS. 1A and 1C), so as to increase vibration energy of the vibration membrane 134. In this way, the electronic device 100 may be enabled to have a flatter response at a lower frequency, while having better sensitivity. Here, the sensitivity may be, for example, increased by more than 50%, but the disclosure is not limited thereto, and an increment ratio may be determined according to actual design requirements.

In some embodiments, the first substrate 110 and the second substrate 140 are circuit substrates. For example, the first substrate 110 and the second substrate 140 are printed circuit boards (PCBs), a material of the partition wall structure 120 includes stainless steel, copper, or a printed circuit board, a material of the mass 132 is metal (for example, stainless steel or copper), and a material of the vibration membrane 134 is plastic (for example, polytetrafluoroethylene (PTFE), polyethylene (PE), polyimide (PI), or polyether ether ketone (PEEK)), and the multiple first electrically conductive parts 160 are multiple metal solder balls, but the disclosure is not limited to thereto, and each of the above-mentioned elements may be replaced by any other suitable materials.

In some embodiments, the first chamber C1 and the second chamber C2 are two independent chambers. In addition, the electronic device 100 may only include the first chamber C1 and the second chamber C2, but the disclosure is not limited thereto.

In the embodiment, the electronic device 100 further includes a sensor 170 that is disposed on the first surface 110*a* and covering the through hole 112. The sensor 170 may include a processor chip 172 and a sensor chip 174. Furthermore, the sensor chip 174 may be a microphone element, so as to sense an air pressure change generated by the vibration of the pressurizing component 130, and the processor chip 172 may be an application-specific integrated circuits (ASIC), so as to receive and process a signal measured by the microphone element, but the disclosure is not limited thereto.

In some embodiments, the sensor chip 174 covers the through hole 112, while the processor chip 172 is disposed in parallel next to the sensor chip 174, and the processor chip 172 and the sensor chip 174 may be configured on the first substrate 110 by adhesion, but the disclosure is not limited thereto. The processor chip 172 and the sensor chip 174 may be configured according to the actual design requirements.

In some embodiments, the sensor 170 is formed in the first chamber C1 and is configured between the first substrate 110 and the vibration membrane 134. In other words, a height of the first chamber C1 may be greater than a height of the sensor 170. In this way, the first chamber C1 may use a space between the sensor 170 (the processor chip 172 and the sensor chip 174) and the pressurizing component 130, so as to enable the electronic device 100 to increase the volume of the first chamber C1 without changing its size. Therefore, the structure of the disclosure also has a capability of making the device thinner, but the disclosure is not limited thereto.

In some embodiments, configurations of the sensor 170, the first substrate 110, and the multiple first electrically conductive parts 160 are at least partially overlapped. For example, orthographic projections of the sensor 170, the first substrate 110, and the multiple first electrically conductive parts 160 on the second substrate 140 at least partially overlapped, therefore the multiple first electrically conductive parts 160 may provide support for the sensor 170 and the first substrate 110, so as to ensure that the electronic device 100 has better reliability. In addition, a height range of each of the first electrically conductive parts 160 may be within a certain range, such as between 30 μm and 50 μm, but the disclosure is not limited thereto. It should be noted that the disclosure does not limit the height, number, and configuration positions of the first electrically conductive parts 160, which may be adjusted according to actual requirements.

In some embodiments, the electronic device 100 further includes a solder wire 180 and an insulation layer 190 disposed on the sensor 170, and a formation step may be to form the solder wire 180 on the sensor 170 first, and then form the insulation layer 190 on the sensor 170.

Therefore, the insulation layer 190 may wrap around a portion of the solder wire 180. Furthermore, a shortest distance d1 of the insulation layer 190 relative to the vibration membrane 134 may be smaller than a shortest distance d2 of the solder wire 180 relative to the vibration membrane 134. In other words, the insulation layer 190 is closer to the vibration membrane 134 than the solder wire 180. In this way, when the electronic device 100 is undergoing reliability testing, the insulation layer 190 may serve as a stop component to reduce a probability of the solder wire 180 being crushed. Therefore, the insulation layer 190 may effectively protect the solder wire 180 and improve the reliability of the electronic device 100, but the disclosure is not limited thereto.

In some embodiments, the solder wire 180 may connect to the processor chip 172 and the sensor chip 174, so as to form an electrical connection between the processor chip 172 and the sensor chip 174. A height of the processor chip 172 may be lower than a height of the sensor chip 174, and a top end of the solder wire 180 may be located above the sensor chip 174. In addition, the electronic device 100 further includes another solder wire (not marked) connecting the processor chip 172 and the first substrate 110 to form an electrical connection between the processor chip 172 and the first substrate 110, but the disclosure is not limited thereto.

In some embodiments, a material of the solder wire 180 is gold or other suitable electrically conductive materials, and a material of the insulation layer 190 is vinyl or other suitable insulating materials, but the disclosure is not limited thereto.

In the embodiment, the mass 132 is disposed on the vibration membrane 134 and is located in the first chamber C1. Therefore, the mass 132, the solder wire 180, and the insulation layer 190 are all located in the first chamber C1, but the disclosure is not limited thereto. In other embodiments, the position of the mass 132 may have other setups.

In some embodiments, the electronic device 100 further includes a back cavity C3. Air in the back cavity C3 circulates with air in the second chamber C2 through the gap G For example, the back cavity C3 may be a space formed by the sensor chip 174 and the through hole 112, but the disclosure is not limited thereto.

In some embodiments, the electronic device 100 further includes a second electrically conductive part 162. The second electrically conductive part 162 is surround disposed between the shell 150 and the second substrate 140. Furthermore, the second electrically conductive part 162 may be a metal solder ball or a suitable electrically conductive terminal. Therefore, the shell 150 may form an electrical connection with the second substrate 140 through the second electrically conductive part 162. In addition, the shell 150 is made of a metal material and has at least one groove 151, and the first chamber C1 is formed in the at least one groove 151. In other words, the shell 150 may surround the sensor 170. Therefore, the sensor 170 may reduce a probability of being subjected to electromagnetic interference through this configuration, but the disclosure is not limited thereto.

In some embodiments, the electronic device 100 further includes an opening 152 that connects the second chamber C2 to external air, so as to release pressure in the second chamber C2. For example, the opening 152 may be located on the shell 150, as shown in FIG. 1B, but the disclosure is not limited thereto. In an unillustrated embodiment, the opening may also be disposed at the second substrate 140 or other suitable positions, and as long as it may be used to release the pressure in the second chamber C2, it falls within the protection scope of the disclosure. Here, the pressure of the second chamber C2 may be generated by a high temperature process in the manufacturing process.

In some embodiments, the electronic device 100 further includes a fixing ring 10 disposed between the vibration membrane 134 and the partition wall structure 120. The fixing ring 10 is made of a rigid material, therefore the pressurizing component 130 and the partition wall structure 120 may be enabled to connect to each other in a more exacting manner, so as to improve the reliability of the electronic device 100, but the disclosure is not limited thereto.

It should be noted here that the following embodiments continue to use the reference numerals and a portion of the content of the above embodiments. The same or similar reference numerals are used to represent the same or similar elements, and description of the same technical content is omitted. Reference may be made to the foregoing embodiments for the description of the omitted portions, which are not repeated in the following embodiments.

Figure 2:
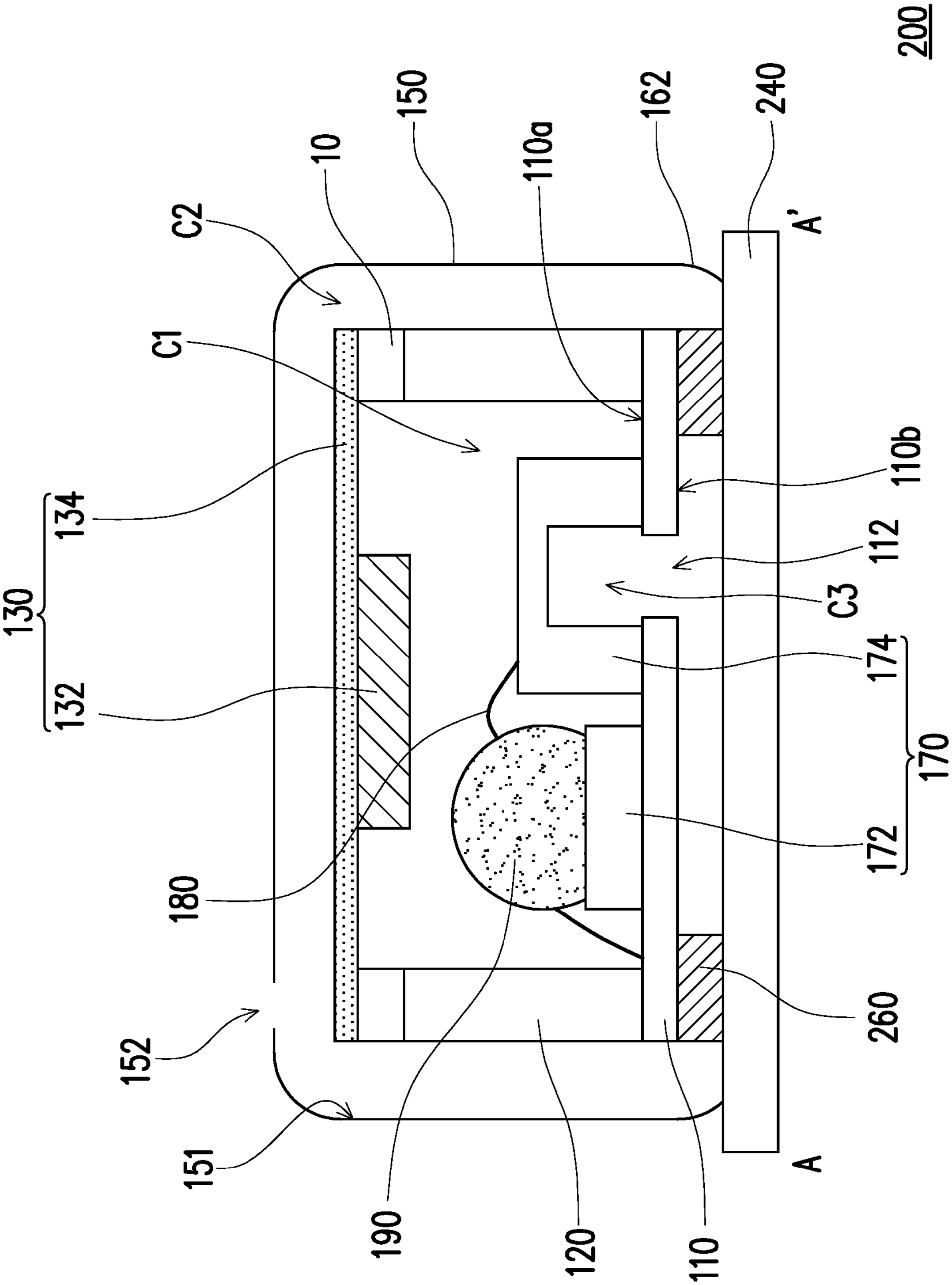
FIG. 2 is a schematic cross-sectional view of an electronic device according to another embodiment of the disclosure.

FIG. 2 is a schematic cross-sectional view of an electronic device according to another embodiment of the disclosure. With reference to FIG. 2, as compared to the electronic device 100, multiple first electrically conductive parts 260 of an electronic device 200 of the embodiment are a portion of a second substrate 240, protruding from an upper surface of the second substrate 240 towards the first substrate 110, and forming an electrical connection with the first substrate 110. For example, the second substrate 240 is a printed circuit board, and the first electrically conductive parts 260 are electrically conductive circuit contact points thereon, but the disclosure is not limited thereto.

Figure 3:
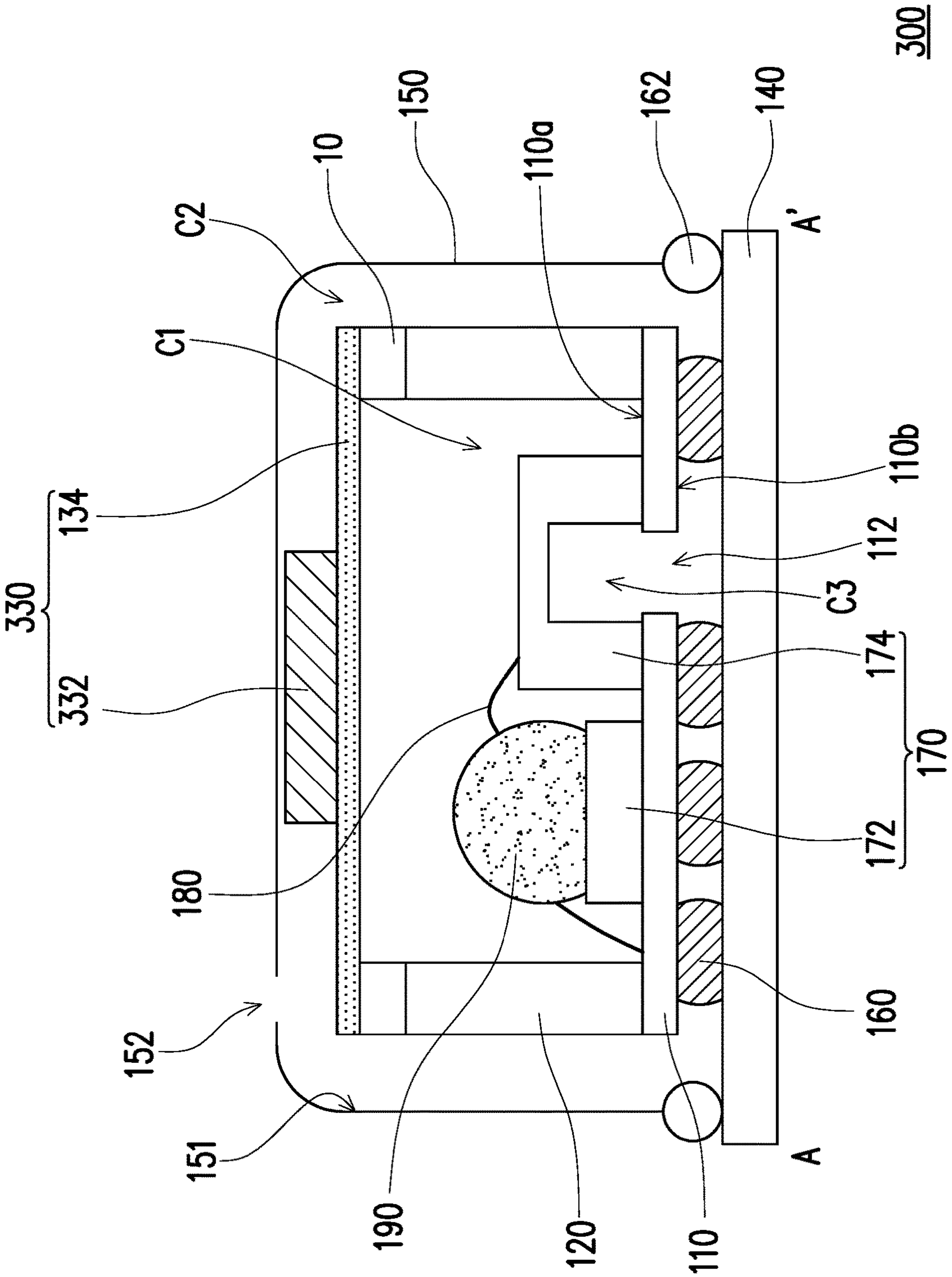
FIG. 3 is a schematic cross-sectional view of an electronic device according to yet another embodiment of the disclosure.

FIG. 3 is a schematic cross-sectional view of an electronic device according to yet another embodiment of the disclosure. With reference to FIG. 3, as compared to the electronic device 100, a mass 332 of a pressurizing component 330 of an electronic device 300 of the embodiment is disposed on the vibration membrane 134 and located outside the first chamber C1. In other words, the mass 332 of the pressurizing component 330 may be located in the second chamber C2. Therefore, the vibration membrane 134 is located between the mass 332 and the sensor 170, but the disclosure is not limited thereto.

Figure 4:
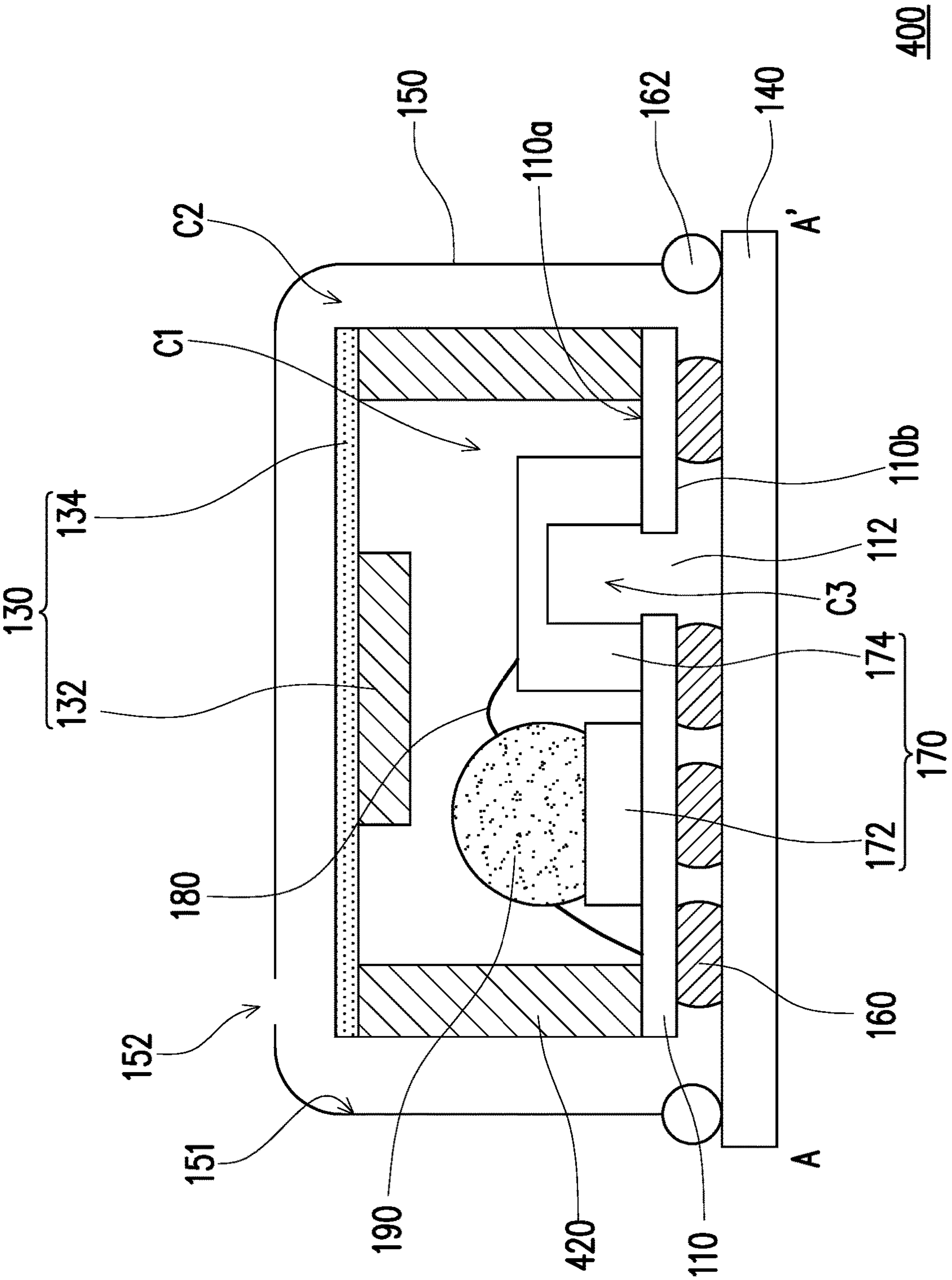
FIG. 4 is a schematic cross-sectional view of an electronic device according to still another embodiment of the disclosure.

FIG. 4 is a schematic cross-sectional view of an electronic device according to still another embodiment of the disclosure. With reference to FIG. 4, as compared to the electronic device 100, the fixing ring of an electronic device 400 of the embodiment and a partition wall structure 420 are an integrally formed ring structure, and the partition wall structure 420 may be a pre-formed component which is then directly joined onto the first substrate 110. Therefore, convenience of the manufacturing process may be increased. On the other hand, a material of the partition wall structure 420 may be substantially the same as the material of the mass 132, but the disclosure is not limited thereto. The material of the partition wall structure 420 may also be different from the material of the mass 132.

Figure 5:
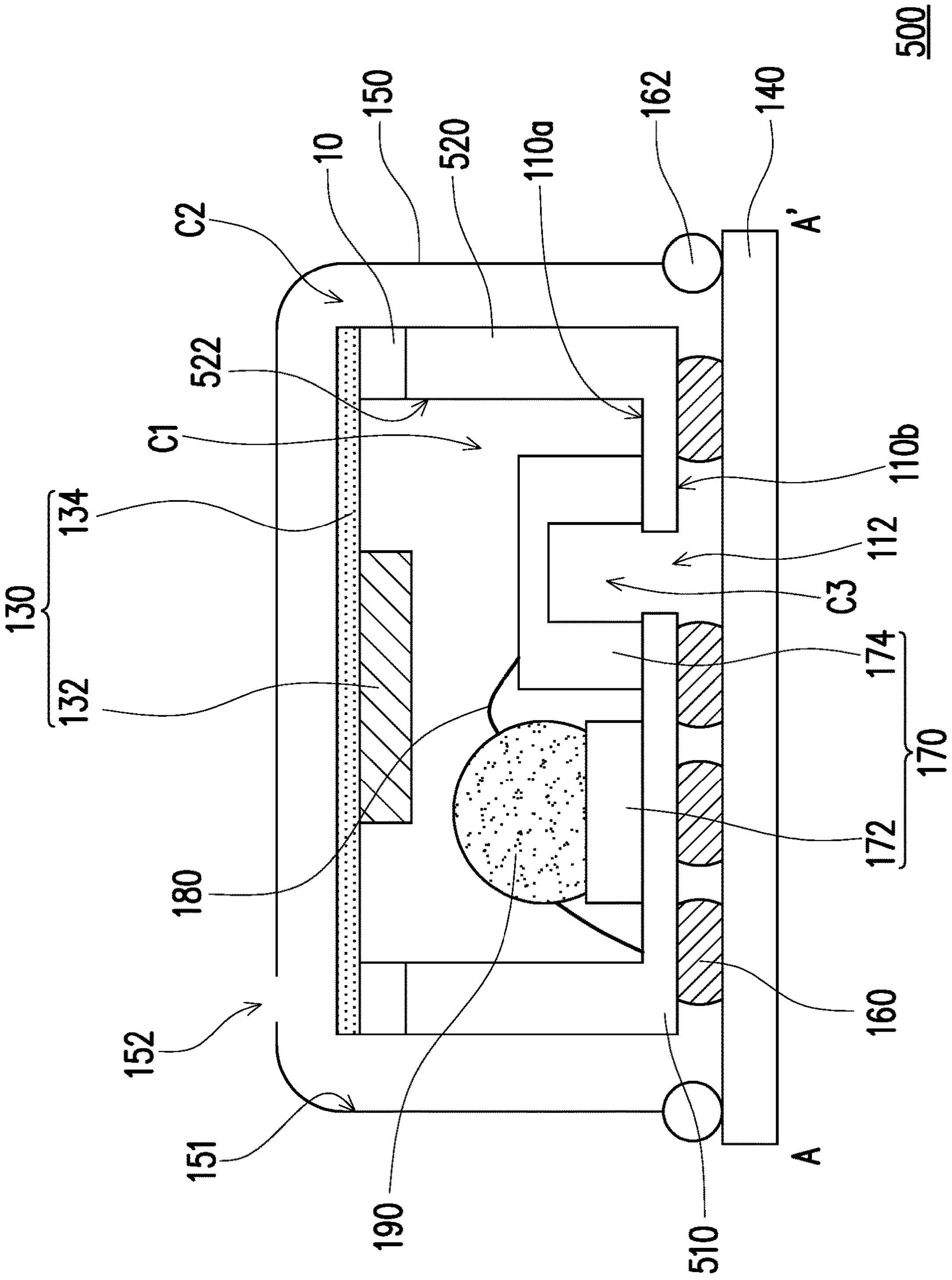
FIG. 5 is a schematic cross-sectional view of an electronic device according to yet another embodiment of the disclosure.

FIG. 5 is a schematic cross-sectional view of an electronic device according to yet another embodiment of the disclosure. With reference to FIG. 5, as compared to the electronic device 100, a partition wall structure 520 of an electronic device 500 of the embodiment and a first substrate 510 are jointly formed as a printed circuit board structure with a groove 522. In other words, the partition wall structure 520 and the first substrate 510 are an integral structure, but the disclosure is not limited thereto.

In summary, the electronic device of the disclosure may increase the volume of the first chamber and reduce the air resistance by disposing the pressurizing component on the partition wall structure and covering the first chamber, thereby effectively improving its sensitivity. In addition, since there are gaps between the multiple first electrically conductive parts that are disposed between the first substrate and the second substrate, air can circulate in the second chamber (the direction of circulation is, for example, from the through hole of the first substrate, passing through the gap, and then back to the pressurizing component from the bottom to the top), so as to increase the vibration energy of the vibration membrane. In this way, the electronic device may be enabled to have the flatter response at the lower frequency and better sensitivity.

Although the disclosure has been described with reference to the abovementioned embodiments, but it is not intended to limit the disclosure. It is apparent that any one of ordinary skill in the art may make changes and modifications to the described embodiments without departing from the spirit and the scope of the disclosure. Accordingly, the scope of the disclosure is defined by the claims appended hereto and their equivalents in which all terms are meant in their broadest reasonable sense unless otherwise indicated.

What is claimed is:

1. An electronic device, comprising:
- a first substrate, having a through hole, and a first surface and a second surface that are opposite to each other;
- a partition wall structure, disposed on the first surface and surrounds to form a first chamber;
- a pressurizing component, disposed on the partition wall structure and covering the first chamber, wherein the pressurizing component comprises at least a mass and a vibration membrane;
- a second substrate;
- a shell, disposed on the second substrate and jointly forms a second chamber with the second substrate, wherein the first chamber is formed in the second chamber;
- a plurality of first electrically conductive parts, disposed between the first substrate and the second substrate, wherein there is a gap between any two adjacent first electrically conductive parts; and
- a back cavity, wherein air in the back cavity circulates with air in the second chamber through the gap between any two adjacent first electrically conductive parts.

2. The electronic device according to claim 1, further comprising:
- a sensor, disposed on the first surface and covering the through hole.

3. The electronic device according to claim 2, further comprising:
- a solder wire and an insulation layer, disposed on the sensor, wherein the insulation layer wraps around a portion of the solder wire.

4. The electronic device according to claim 3, wherein a shortest distance of the insulation layer relative to the vibration membrane is smaller than a shortest distance of the solder wire relative to the vibration membrane.

5. The electronic device according to claim 2, wherein the sensor is formed in the first chamber and is disposed between the first substrate and the vibration membrane.

6. The electronic device according to claim 2, wherein configurations of the sensor, the first substrate, and the plurality of first electrically conductive parts are at least partially overlapped.

7. The electronic device according to claim 1, wherein the plurality of first electrically conductive parts are a portion of the second substrate, protrude from an upper surface of the second substrate toward the first substrate and forms an electrical connection with the first substrate.

8. The electronic device according to claim 1, wherein the plurality of first electrically conductive parts are a plurality of metal solder balls.

9. The electronic device according to claim 1, wherein a height range of each of the plurality of first electrically conductive parts is between 30 μm and 50 μm.

10. The electronic device according to claim 1, wherein the shell is made of a metal material and has at least one groove, and the first chamber is formed in the at least one groove.

11. The electronic device according to claim 1, further comprising:
- a second electrically conductive part, wherein the second electrically conductive part is surround disposed between the shell and the second substrate, and the shell forms an electrical connection with the second substrate through the second electrically conductive part.

12. The electronic device according to claim 1, further comprising:
- an opening, connecting the second chamber with external air, so as to release pressure in the second chamber.

13. The electronic device according to claim 12, wherein the opening is located on the shell.

14. The electronic device according to claim 1, wherein the mass is disposed on the vibration membrane and is located in the first chamber.

15. The electronic device according to claim 1, wherein the mass is disposed on the vibration membrane and is located outside the first chamber.

16. The electronic device according to claim 1, further comprising:
- a fixing ring, disposed between the vibration membrane and the partition wall structure, wherein the fixing ring is made of a rigid material.

17. The electronic device according to claim 16, wherein the fixing ring and the partition wall structure are an integrally formed ring structure.

18. The electronic device according to claim 1, wherein the partition wall structure and the first substrate are jointly formed as a printed circuit board structure with a groove.

19. The electronic device according to claim 1, wherein the first chamber and the second chamber are two independent chambers.

* * * * *